US010652281B1

(12) United States Patent
Moolenaar et al.

(10) Patent No.: US 10,652,281 B1
(45) Date of Patent: May 12, 2020

(54) NETWORK POLICY IMPLEMENTATION IN A TAG-BASED POLICY ARCHITECTURE

(71) Applicant: VMware, Inc., Palo Alto, CA (US)

(72) Inventors: Marcel Moolenaar, Mountain View, CA (US); Dennis Ramdass, Mountain View, CA (US); Ramya Olichandran, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 341 days.

(21) Appl. No.: 15/692,890

(22) Filed: Aug. 31, 2017

(51) Int. Cl.
G06F 17/00 (2019.01)
H04L 29/06 (2006.01)

(52) U.S. Cl.
CPC .......... H04L 63/20 (2013.01); H04L 63/0236 (2013.01); H04L 63/0263 (2013.01); H04L 63/0428 (2013.01)

(58) Field of Classification Search
CPC . H04L 63/20; H04L 63/0428; H04L 63/0263; H04L 63/0236
USPC .......................................................... 726/1
See application file for complete search history.

(56) References Cited

U.S. PATENT DOCUMENTS 5,550,816 A * 8/1996 Hardwick ........... H04L 12/4604
370/397
7,818,452 B2 * 10/2010 Matthews ........... H04L 12/2876
370/400
8,611,351 B2 * 12/2013 Gooch ................ H04L 12/4633
370/389
9,292,331 B2 3/2016 Lango et al.
9,306,978 B2 4/2016 Lango et al.
9,335,932 B2 5/2016 Lango et al.
9,535,741 B1 1/2017 Lango et al.
9,578,064 B2 2/2017 Lango et al.
10,445,509 B2 10/2019 Thota et al.
2003/0069972 A1 * 4/2003 Yoshimura .......... H04L 12/4645
709/226
2013/0125230 A1 * 5/2013 Koponen ............ H04L 41/0823
726/13

FOREIGN PATENT DOCUMENTS

WO WO-2014151126 A1 9/2014

* cited by examiner

Primary Examiner — Samson B Lemma
(74) Attorney, Agent, or Firm — Patterson + Sheridan, LLP

(57) ABSTRACT

A technique implements network policy deployed in a tag-based policy architecture of a virtualized computing environment. One or more virtual machine instances (VMIs) may be provided by a virtual data center (VDC) of the environment, wherein each VMI includes an intermediary manager of a computing cell that also includes a guest operating system (OS) and associated applications. The tag-based policy architecture may be configured to enforce the network policy in the virtualized computing environment using cryptographically-verifiable metadata to authenticate compute resources, such as the VMIs, coupled to a computer network and to authorize access to protected resources, such as virtualized network resources of the VDC.

20 Claims, 9 Drawing Sheets

NETWORK POLICY IMPLEMENTATION IN A TAG-BASED POLICY ARCHITECTURE

BACKGROUND

Technical Field

The present disclosure relates to virtualized computing environments and, more specifically, to implementing network policy in a virtualized computing environment.

Background Information

Many enterprises (i.e., customers) utilize virtual machines provided by a virtual data center (VDC) of a virtualized computing environment, wherein the VDC may be a cloud service provider (CSP) deployed as a private or public cloud of computer systems. The CSP may furnish virtualized resources, such as virtualized storage, network and/or compute resources, for instances of virtual machines (virtual machine instances, VMIs), which resources are accessible over a computer network. A VMI may include a guest operating system (OS) configured to utilize the virtualized resources, which are managed by a hypervisor of the VMI.

For these customers to secure the computer network, the CSP typically presents a framework for providing a network policy by specifying, e.g., the VMIs that are allowed to communicate with each other, the network (packet) traffic that is allowed to ingress into and egress from a VMI, and the ingress/egress packet traffic that should be encrypted before propagating over the network. Typically, the network policy framework relies on an infrastructure of a third party (e.g., CSP) that the customer does not control. The third party infrastructure may implement network layer address-based tables as firewall functionality on the guest OS, which allows the guest OS to control the ingress/egress packet traffic. The infrastructure may also include encryption functionality on the guest OS that allows the guest OS to encrypt/decrypt the traffic. However, enforcement of the network policy can be modified or turned off (disabled) at the guest OS by a user that has access to the guest OS. Yet, the customer may desire a strong enforcement of the network policy, i.e., an assurance that the network policy enforcement cannot be modified or turned off by the guest OS. It is thus desirable to enable an administrator of the customer that is external to the guest OS to implement and control the network policy enforcement so as to prevent any modification or disablement of the policy by the guest OS.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
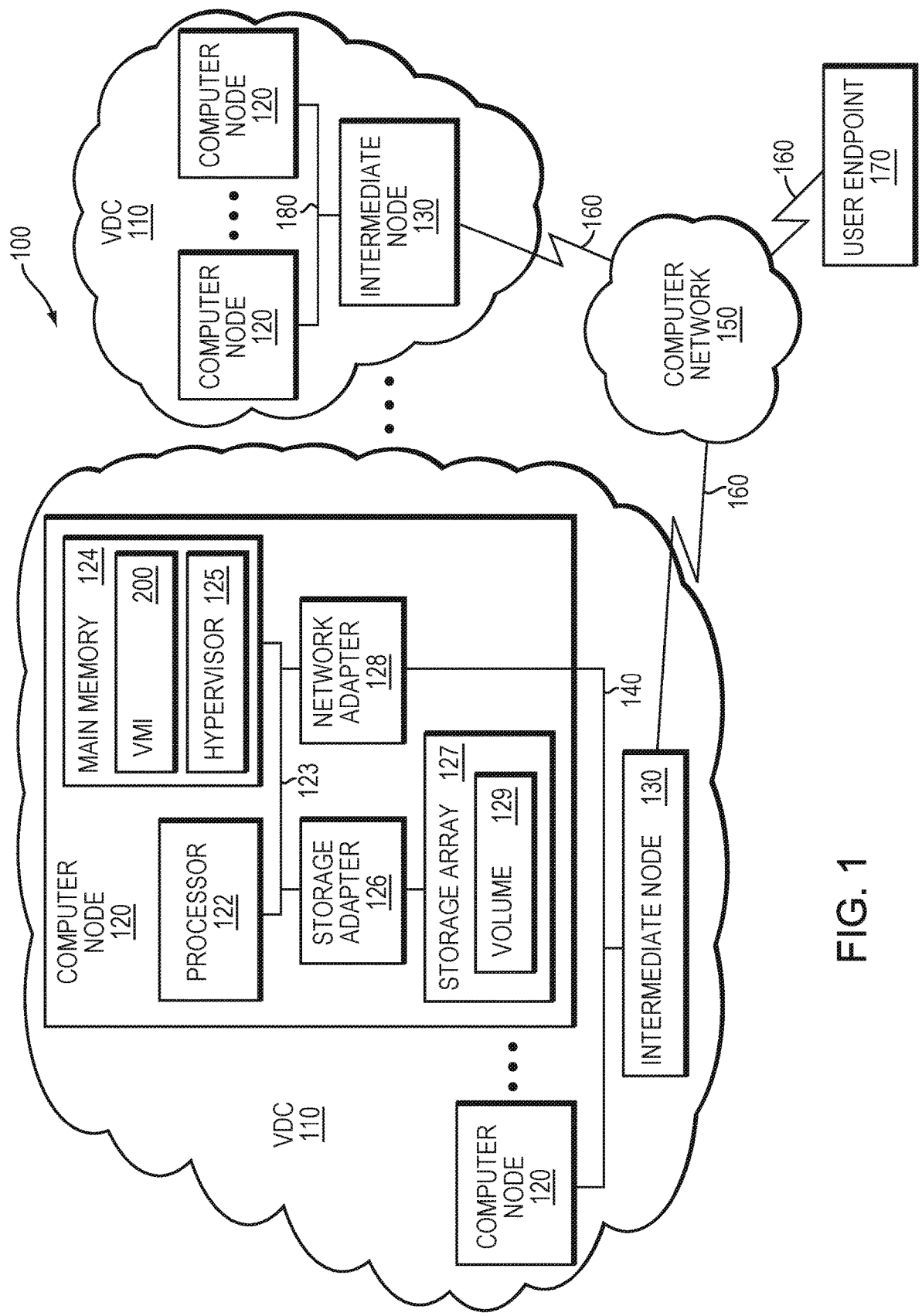
FIG. 1 is a block diagram of a virtualized computing environment.

The embodiments described herein are directed to a technique for implementing network policy deployed in a tag-based policy architecture of a virtualized computing environment. One or more virtual machine instances (VMIs) may be provided by a virtual data center (VDC) of the environment, wherein each VMI includes an intermediary manager, e.g., a meta-hypervisor (metavisor), of a computing cell that also includes a guest operating system (OS) and associated applications. The tag-based policy architecture may be configured to enforce the network policy in the virtualized computing environment using cryptographically-verifiable metadata to authenticate compute resources, such as the VMIs, coupled to a computer network and to authorize access to protected resources, such as virtualized network resources of the VDC. The tag-based policy architecture may include an infrastructure having a centralized policy decision endpoint (e.g., a control plane of the VDC) and distributed policy enforcement endpoints (e.g., metavisors of the VMIs) that use end-to-end passing of cryptographically-verifiable metadata to authorize instantiation of the VMI via the control plane, and to enforce access to the protected resources at the metavisors.

In an embodiment, the network policy may be employed at the metavisors to control end-to-end communication between the compute resources (e.g., two different VMIs, a guest OS and a VMI) using network configuration to establish connections and/or encryption of network flows. As used herein, network policy may denote a pattern of network (packet) traffic with an associated action against which a network flow of a packet is compared. Network flows represent network activity performed by the guest OS, i.e., any packet sent or received by the metavisor on behalf of the guest OS is part of a network flow. The network flow may be defined as a 5-tuple that includes information obtained from internet layer (IP) and transport layer (transport control protocol, TCP, and user datagram protocol, UDP) headers of a packet, such as (i) source and (ii) destination IP addresses, as well as (iii) source and (iv) destination port numbers, and (v) protocol type. The network policy may also be defined as a 5-tuple that includes a source, a destination, protocol type, one or more (i.e., a range of) destination port numbers, and an action, wherein the source and destination may be identified implicitly using tags. A tag is an arbitrary key-value pair embedded within a payload of a token data structure (illustratively a JSON web token, JWT) as one or more private claims that enable attachment of the network policy to one or more instances, e.g., metavisors of VMIs.

According to the technique, attachment (assignment) of network policy to the metavisors may be effected by associating the network policy to a global firewall and apportioning (i.e., dividing) the global firewall into individual firewalls applied at the metavisors running in the network. Illustratively, implementation of the global firewall is distributed to the metavisors acting as individual firewalls, each enforcing the network policy via their respective portion of the global firewall. To that end, the control plane translates the network policy/global firewall into rules of an individual firewall, illustratively embodied as a packet filter (PF) rule set, for each metavisor, wherein each of the rules in the set includes a policy condition and an action. The network policy may be a set of matched policy conditions that trigger (i.e., invoke) the corresponding actions by examination of one or more firewall rules of the PF rule set, e.g., if content of a packet/header matches the policy condition of a rule, then an action on the packet is performed.

Illustratively, the policy condition may be provided as one or more physical constructs based on protected resources (e.g., an Ethernet port) or packet information, such as any of the elements of the 5-tuple network flow, and/or one or more logical constructs, such as the tags contained in the payload of the JWT token. However, enforcement of the rules (e.g., the PF rule set) at the individual firewalls generally relies on physical (not logical) constructs. That is, logical constructs (e.g., tags) included in the network policy may include abstractions (e.g., "production" and "development") that are not resolved at the individual firewalls (e.g., metavisors). The control plane thus further translates the logical constructs (e.g., tags) into physical constructs (e.g., IP addresses) that are present in the network traffic (e.g., packets) and that form the basis of the rules of the PF rule set distributed to each metavisor. As a result, the tag-based policy architecture operates (i.e., enforces network policy) without (1) modification of the guest OS, such as insertion of an agent, and without (2) enforcement in a network infrastructure (e.g., a network switch) as opposed to endpoints (i.e., the VMIs).

As noted, network policy enforced on the firewall may be implemented as one or more firewall rules having an action, e.g., encrypt. The firewall rules may be organized as an IP address-based data structure (e.g., a PF address table) that may be accessed independently by a PF module of the metavisor e.g., via a lookup operation for the policy condition of the rule, and may be accessed by an encryption/decryption module of the metavisor, e.g., via a separate lookup operation for the action of the rule. According to the technique, a hybrid PF and encryption/decryption (i.e., hybrid PF/IPSec) implementation for enforcing network policy provides only a single lookup operation for these modules. Illustratively, a packet arriving at the metavisor is processed first by the PF module, which performs the lookup operation into the PF address table to determine a matched policy condition and whether an encryption action should be performed on the packet. If so, the PF module applies (i.e., associates) an internal action flag (e.g., a software construct instructing the action "encrypt") to the packet, and the metavisor invokes (i.e., calls) the encryption/decryption module to encrypt the packet. As a result, packets are decrypted prior to firewall rule application (i.e., network policy enforcement), so that the firewall can operate on the non-encrypted network flow information, such as the transport layer (TCP or UDP) header information (which is normally hidden/encrypted using IPSec) and, particularly, the port numbers to correctly identify the network flow.

An aspect of network policy relates to providing visibility (i.e., monitoring) of network traffic on the computer network and, more specifically, to customer monitoring of network flows over the network. The control plane may provide flow visibility to a customer using, e.g., a standard protocol such as the NetFlow protocol, to publish the network flows of packets processed by the PF module of the metavisor. According to the technique, the PF module maintains information of the processed network flows in a flow-based data structure (e.g., a PF flow table) as 5-tuple flow state that may be replicated to a mirror data structure (e.g., PF mirror table) illustratively using, e.g., a PF sync operation at the metavisor. The metavisor may then translate the 5-tuple flow state of the PF mirror table into a format of a NetFlow packet that is delivered to the control plane for publication (e.g., display) to the customer. In addition, the translation may add information, e.g., via an extension such as a vendor proprietary field, to the NetFlow packet that allows the control plane to determine the network policy associated with a network flow, e.g., the extension includes an identity of the guest OS of the VMI associated with the metavisor that originated the network flow.

DESCRIPTION

FIG. 1 is a block diagram of a virtualized computing environment 100 that includes one or more computer nodes 120 and intermediate nodes 130 illustratively embodied as one or more virtual data centers (VDCs) 110 interconnected by a computer network 150. In some embodiments, the VDCs may be cloud service providers (CSPs) deployed as private clouds or public clouds, such as deployments from Amazon Web Services (AWS), Google Cloud Services, Microsoft Azure, or VMware vCloud. Each VDC 110 may be configured to provide virtualized resources, such as virtual storage, network, and/or compute resources for one or more instances of virtual machines (virtual machine instances, VMIs), which resources are accessible over the computer network 150, such as the Internet. Each computer node 120 is illustratively embodied as a computer system having one or more processors 122, a main memory 124, one or more storage adapters 126, and one or more network adapters 128 coupled by an interconnect, such as a system bus 123. The storage adapter 126 may be configured to access information (e.g., data) stored as one or more volumes 129 (e.g., root and/or data volumes) on magnetic/solid state storage devices (e.g., disks or other similar persistent media) of storage array 127. To that end, the storage adapter 126 may include input/output (I/O) interface circuitry that couples to the disks over an I/O interconnect arrangement, such as a conventional peripheral component interconnect (PCI) or serial ATA (SATA) topology.

The network adapter 128 connects the computer node 120 to other computer nodes 120 of the VDC 110 over local network segments 140 illustratively embodied as shared local area networks (LANs) or virtual LANs (VLANs). The network adapter 128 may thus be embodied as a network interface card having the mechanical, electrical and signaling circuitry needed to connect the computer node 120 to the local network segments 140. The intermediate node 130 may be embodied as a network switch, router, or virtual private network (VPN) gateway that interconnects the LAN/VLAN local segments with remote network segments 160 illustratively embodied as point-to-point links, wide area networks (WANs), and/or VPNs implemented over a public network (such as the Internet) and connect user endpoints 170 embodied as other computer nodes. Communication over the network segments 140, 160 may be effected by exchanging discrete frames or packets of data according to predefined protocols, such as the Transmission Control Protocol/Internet Protocol (TCP/IP) and the OpenID Connect (OIDC) protocol, although other protocols, such as the User Datagram Protocol (UDP) or the HyperText Transfer Protocol Secure (HTTPS) may also be advantageously employed.

The main memory 124 of each computer node 120 includes a plurality of memory locations addressable by the processor 122 and/or adapters for storing software code (e.g., processes and/or services) and data structures associated with the embodiments described herein. Each processor and adapter may, in turn, include processing elements and/or circuitry configured to execute the software code, such as a VMI 200 and a hypervisor 125, and manipulate the data structures. The VMI 200 is managed by the hypervisor 125, which is a virtualization platform configured to mask low-level hardware operations from one or more guest operating systems executing in the VMI 200. In an embodiment, the hypervisor 125 is illustratively the Xen hypervisor, although other types of hypervisors, such as the Hyper-V hypervisor and/or VMware ESX hypervisor, may be used in accordance with the embodiments described herein.

It will be apparent to those skilled in the art that other types of processing elements and memory, including various computer-readable media, may be used to store and execute program instructions pertaining to the embodiments described herein. Also, while the embodiments herein are described in terms of software code, processes, and computer, e.g., application, programs stored in memory, alternative embodiments also include the code, processes and programs being embodied as logic, components, and/or modules consisting of hardware, software, firmware, or combinations thereof.

Figure 2:
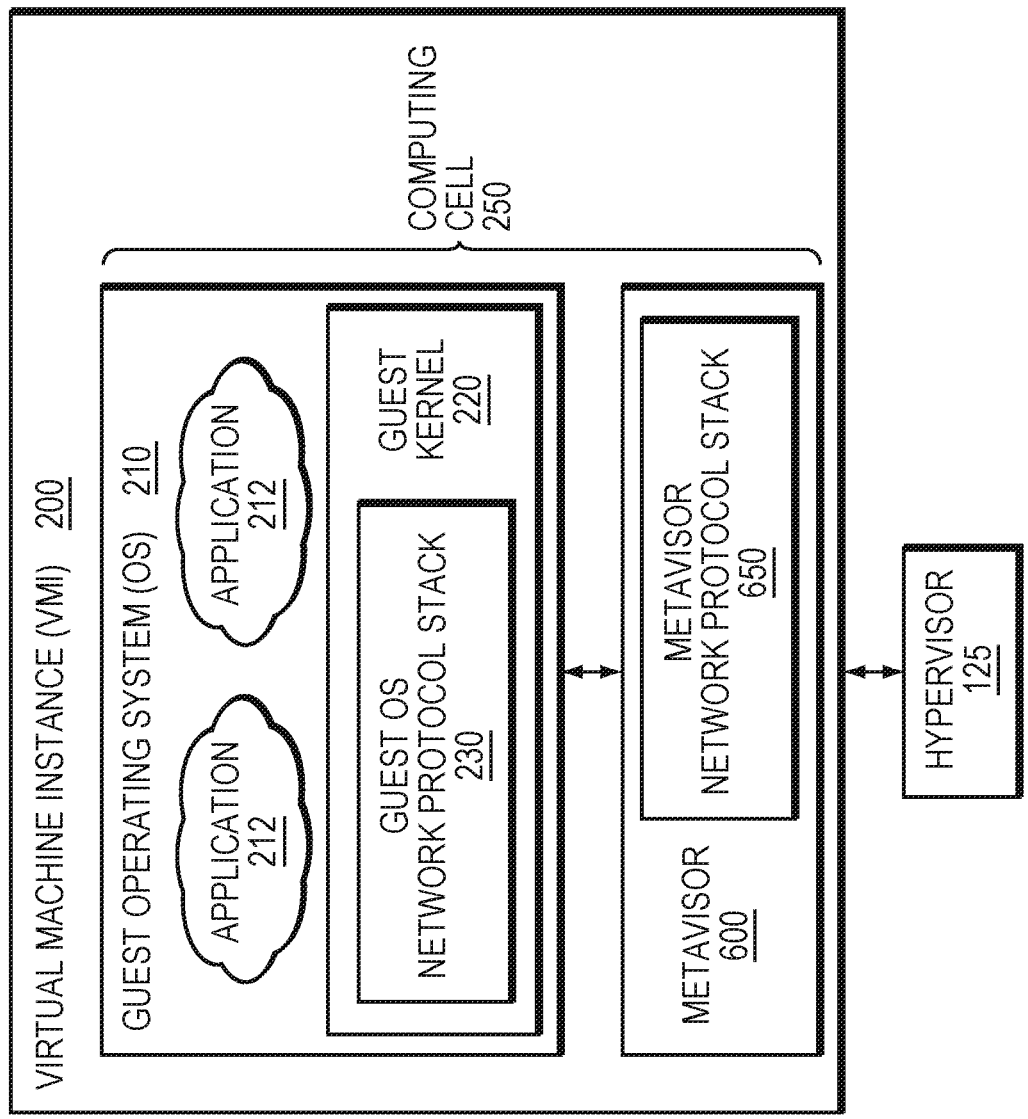
FIG. 2 is a block diagram of a virtual machine instance including a metavisor.

FIG. 2 is a block diagram of the virtual machine instance (VMI) 200. In an embodiment, guest operating system (OS) 210 and associated applications 212 may run in the VMI 200 and may be configured to utilize system (e.g., hardware) resources of the VDC 110. The guest OS 210 may be the Linux® operating system, FreeBSD® and similar operating systems; however, it should be noted that other types of guest OSs, such as the Microsoft Windows® operating system, may be used in accordance with the embodiments described herein. A guest kernel 220 of the guest OS 210 includes a guest OS network protocol stack 230 for exchanging network traffic over a data path of the network established by the network adapter 128 via the hypervisor 125. The guest OS may be managed, at least in part, by an intermediary manager, i.e., metavisor 600, which includes a metavisor network protocol stack 650 and logic for enhancing guest utilization of various VDC resources, such as processor 122, main memory 124, storage adapter 126, and network adapter 128, among others. The VDC resources may be virtualized for the VMI 200, at least partially with the assistance of the hypervisor 125, for use by enterprises, i.e., customers. The hypervisor may present a software interface for processes within the VMI to communicate requests, e.g., hypercalls, directed to the hypervisor to access the VDC resources.

In one or more embodiments, the metavisor 600 and guest OS 210 are independent operating entities (OE) arranged as a computing cell 250 within the VMI 200. The computing cell 250 is illustratively a cloud workload protection platform configured to enable the customers to run workloads securely in hybrid cloud environments using a set of security controls, policies, application and data micro-segmentation (e.g., fine grain control per computing cell), and visibility. The metavisor 600 may be deployed by a customer at a confluence of the computing cell 250 and may include logic that enables implementation and enforcement of the security controls, policies and services for the cell 250 on behalf of the customer. The computing cell 250 is layered over the hypervisor 125 which manages system (e.g., hardware) resources of the VDC. The metavisor 600 illustratively employs an advanced virtualization technique that presents itself to the guest OS 210 as the cloud hypervisor 125, and to the cloud hypervisor 125 as the guest OS 210. That is, the metavisor operates as a transparent intermediary between the guest OS and the cloud hypervisor.

Specifically, the metavisor is located between the hypervisor 125 and guest OS 210 within the VMI 200 (i.e., the metavisor is disposed underneath the guest OS and over the hypervisor) and, as such, can "see" network traffic of the guest OS to access the virtualized resources over the network. Network policy provides a framework for the customers to secure the computer network by specifying, e.g., the VMIs that are allowed to communicate with each other, the network (packet) traffic that is allowed to ingress into and egress from a VMI, and the ingress/egress packet traffic that should be encrypted before propagating over the network. Typically, the network policy framework employed to secure the network relies on an infrastructure of a third party (e.g., CSP) that the customer does not control. However, enforcement of the network policy can be modified or turned off (disabled) at the guest OS by a user that has access to the guest OS. Yet, the customer may desire a strong enforcement of the network policy, i.e., an assurance that the network policy enforcement cannot be modified or turned off by the guest OS. It is thus desirable to enable an administrator of the customer that is external to the guest OS to implement and control the network policy enforcement, e.g., via the metavisor, so as to prevent any disablement of the policy by the guest OS.

Figure 3:
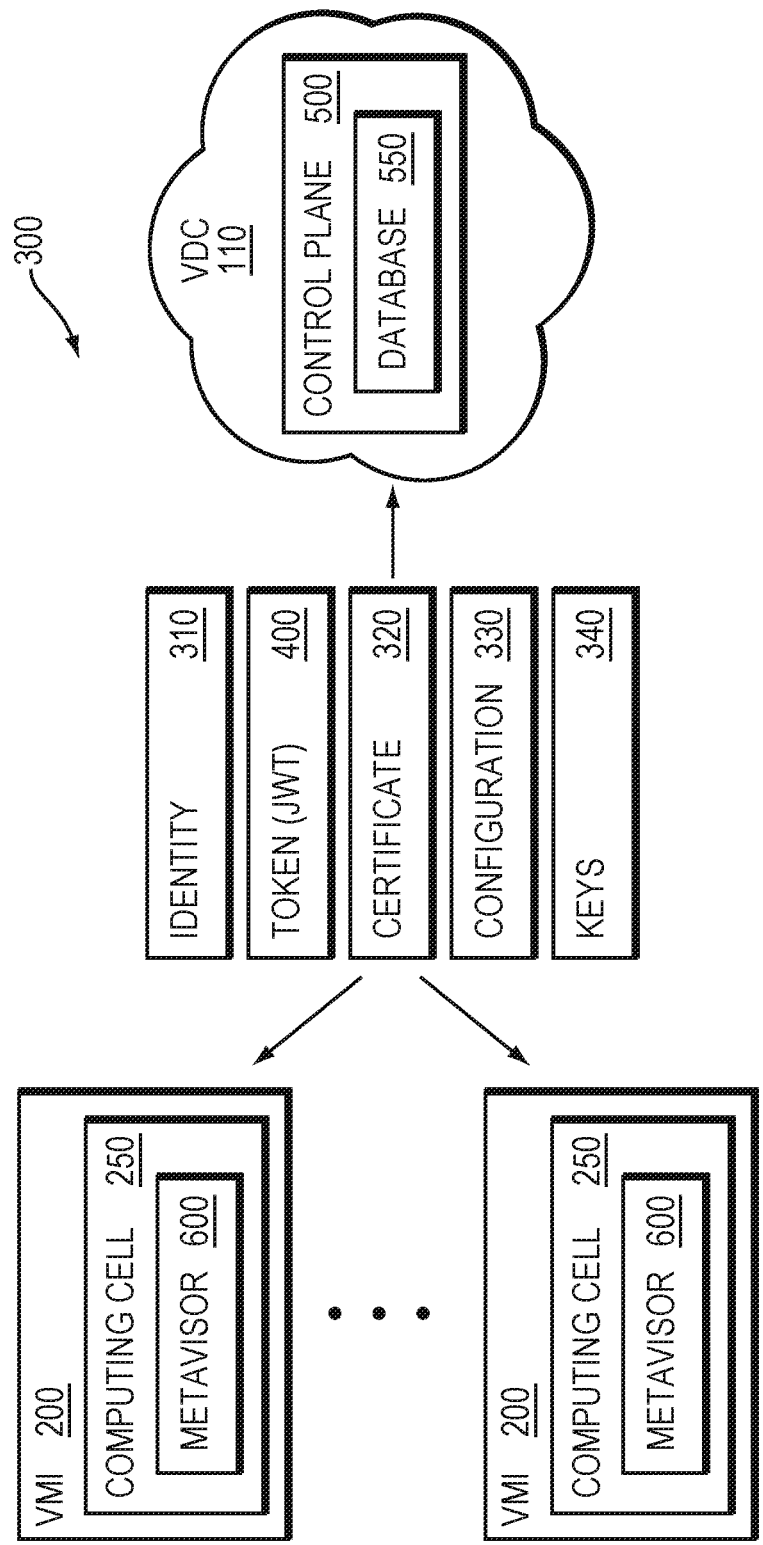
FIG. 3 is a block diagram of a tag-based policy architecture.

The embodiments described herein are directed to a technique for implementing network policy deployed in a tag-based policy architecture of a virtualized computing environment. The tag-based policy architecture may be configured to enforce information technology (IT), e.g., network policy, in the virtualized computing environment using cryptographically-verifiable metadata to authenticate compute resources, such as the VMIs, coupled to a computer network and to authorize access to protected resources, such as virtualized network resources (e.g., services) of the VDC. FIG. 3 is a block diagram of the tag-based policy architecture 300 that includes an infrastructure having a centralized policy decision endpoint (e.g., a control plane 500 of the VDC 110) and distributed policy enforcement endpoints (e.g., metavisors 600 of the VMIs 200) that use end-to-end passing of the cryptographically-verifiable metadata to authorize instantiation of the VMIs 200 via the control plane 500, and to enforce access to the resources at the metavisors 600. To that end, the cryptographically-verifiable metadata may be embodied as tokens 400 and identity documents 310 used to authenticate the VMIs, as well as network certificates 320, configuration 330, and keys 340 used to authorize access to the virtualized (e.g., protected) resources. Note that the cryptographically-verifiable metadata itself may be encrypted to ensure secure transmission of the keys (i.e., secrets). That is, two separate forms of cryptography may be employed: a first cypher to authenticate the metadata and second cypher to render the metadata private during transmission. In an embodiment, the second cypher may be applied via a Transport Layer Security (TLS) protocol.

The identity document 310 is illustratively a JSON file (e.g., an Amazon Web Services instance identity file) that contains metadata describing a VMI (including a metavisor) as provided by a CSP, such as a network address of the metavisor and a geographical region in which the metavisor is allowed to boot. The JSON file may be cryptographically verifiable using CSP provided keys. The metavisor sends the JSON file and a cryptographically-verifiable token 400 to the control plane for authentication, e.g., via a secure (encrypted) connection request. The network certificate 320 is issued by the control plane 500 in response to verifying the identity of a metavisor 600 of an authenticated VMI (i.e., an authenticated metavisor of the VMI) running in the VDC 110 according to the IT policy included in the token. That is, the control plane 500 renders a policy decision whether to permit the metavisor to boot by authenticating the VMI and the metavisor as well as by applying the IT policy. The network certificate illustratively contains the token 400 embedded as an extension that is used to render a distributed IT policy enforcement determination at the metavisor. Note that the control plane 500 authenticates the VMI by verifying the JSON file using the CSP key and further authenticates the metavisor 600 by verifying the token 400. Groups of authenticated metavisors running in the VDC (peer groups) may be associated with an IT policy (e.g., network policy) to form network configuration 330 provided to each metavisor 600 of the groups.

Figure 4:
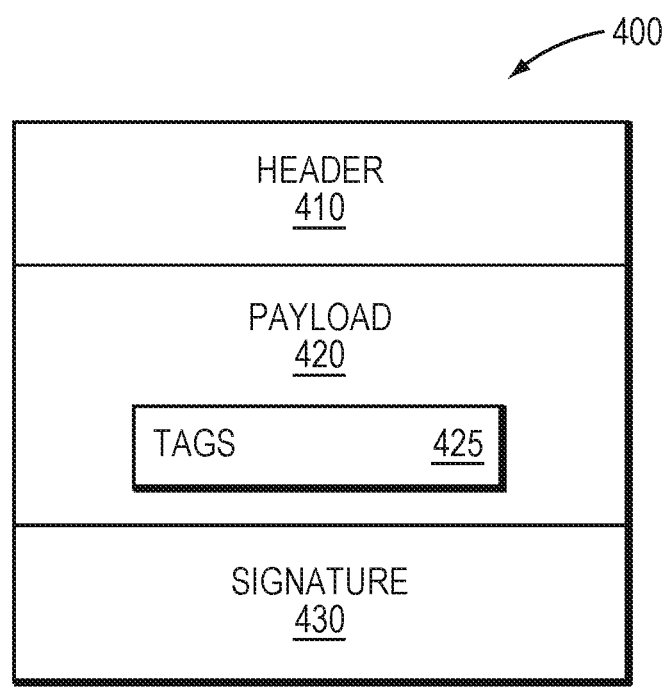
FIG. 4 is a block diagram of a token data structure.

In one or more embodiments, the token 400 is a JSON web token (JWT) data structure (according to Internet Engineering Task Force RFC 7519) that is supplied to a metavisor (i.e., an instance) upon boot. FIG. 4 is a block diagram of a JWT token 400 that includes a header 410, a payload 420, and a signature 430. The header 410 contains metadata about the token 400, such as a key identifier used for verification and a signature algorithm (e.g., an asymmetric encryption algorithm) used to sign the token. A private key of an asymmetric public/private key pair may be used to sign the JWT token 400 at the metavisor 600 and the associated public key of the key pair may be used to authenticate the JWT signature at the control plane 500, e.g., in accordance with the secure connection request. One or more arbitrary key-value pairs (i.e., tags 425) may be embedded within the payload 420 of the token 400 as one or more private claims that enable attachment of IT policy (e.g., a level of access) to a virtualized resource, such as the metavisor, or groups of virtualized resources. The signature 430 authenticates the contents of header 410 and payload 420, which may be verified by applying the signature algorithm. Notably, the JWT may be created by an administrator at the control plane.

Figure 5:
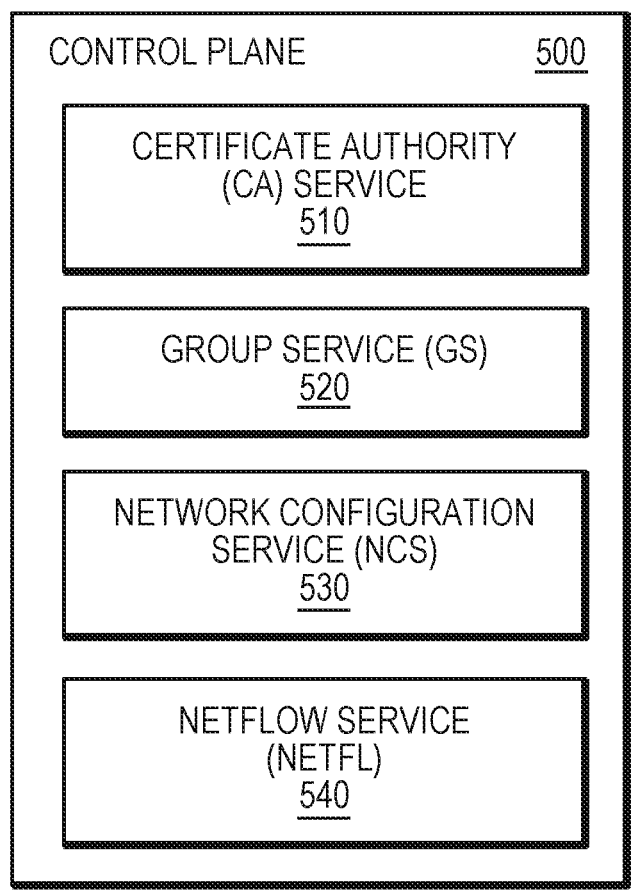
FIG. 5 is a block diagram of a control plane.

In accordance with the centralized/distributed policy infrastructure of the tag-based policy architecture 300, the control plane 500 may perform a centralized policy decision determination for the secure connection request by one or more compute resources, such as metavisors 600 and user endpoints 170, to access protected resources, and each metavisor may perform a distributed policy enforcement determination for the connection request to access the protected resources. FIG. 5 is a block diagram of the control plane 500 having various components embodied as services configured to perform the centralized policy determination, wherein the services include a certificate authority (CA) service 510, a group service (GS) 520, a network configuration service (NCS) 530, and a netflow (NETFL) service 540 used to monitor network traffic. The CA 510 is configured to receive a certificate signing request (CSR) from a metavisor 600 and, upon authentication, return a network certificate 320 to the authenticated metavisor. Accordingly, the CSR/network certificate request/reply communication provides a polling mechanism for the metavisor to obtain IT policy, e.g., via the embedded tags in the token extending the certificate. The GS 520 is configured to obtain information about authenticated metavisors running in the VDC for the purpose of establishing group memberships. The NCS 530 is responsible for supplying an authenticated metavisor with its network configuration 330 and the NETFL 540 is configured to gather network traffic information, which may be presented visually to the customer.

The control plane 500 may run in an instance of a virtual machine (such as, e.g., a VMI 200) as an OE module in a memory (such as, e.g., main memory 124) and is executable by a processor (such as, e.g., processor 122) of a computer node on a network that is accessible to the metavisor 600. As such, the metavisor may be provided a network address to connect with the control plane when instantiated (launched). In one or more embodiments, residence of the control plane may be on a network segment of the VDC 110 (e.g., a CSP) or of a private customer cloud. For example, the control plane may be deployed on-premises where a customer runs the control plane locally in its own data center (on its premises), typically on a virtual machine instance (or directly on the hardware). Alternatively, the control plane 500 may be deployed as a hosted solution via a service running on a public cloud of the CSP. Access to the control plane may be achieved via standard TLS or secure sockets layer (SSL) protocols and custom client search for metavisor access. Cryptographically-verifiable and secure control plane/metavisor interaction may illustratively use public/private key exchange.

Figure 6:
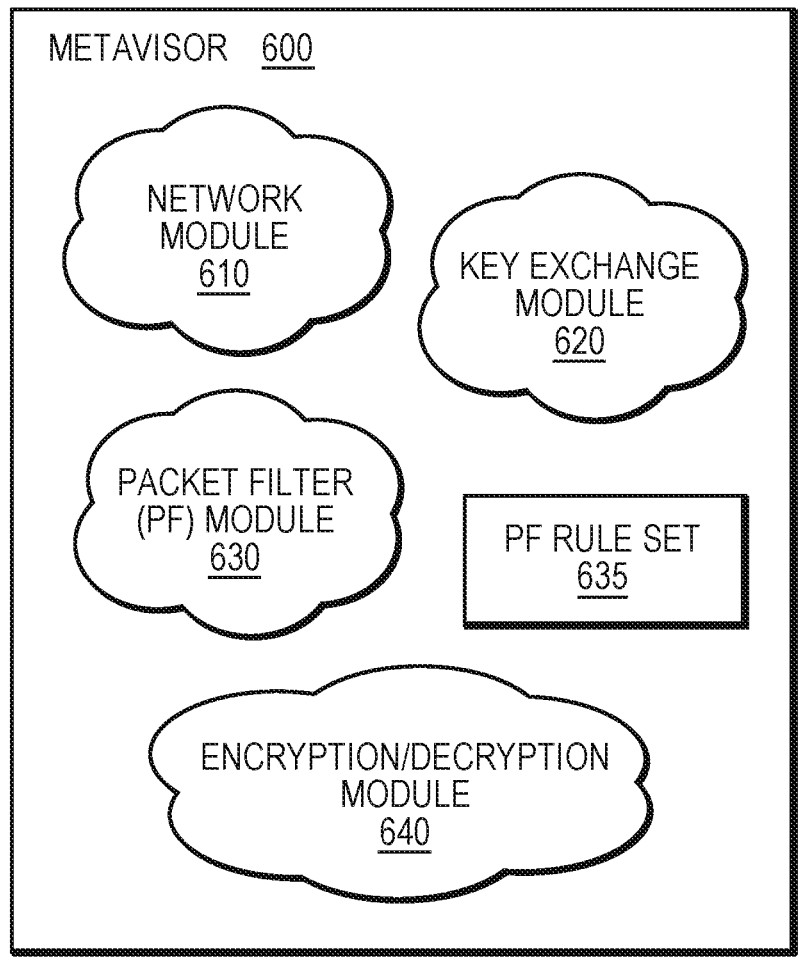
FIG. 6 is a block diagram of the metavisor.

FIG. 6 is block diagram of the metavisor 600 having various components embodied as modules configured to perform the distributed policy enforcement determination. In one or more embodiments, the metavisor 600 is implemented using the NetBSD® OS kernel, although other kernels, such as the FreeBSD® OS kernel, may also be used. Illustratively, the modules of the metavisor 600 include a network module 610, a key exchange module 620, a packet filter (PF) module 630 with an associated PF rule set 635, and an encryption/decryption module 640. The network module 610 is responsible for managing the network configuration 330 within the metavisor. The key exchange module 620 is responsible for authenticating other metavisors and establishing security associations with them for the purpose of encrypting network traffic. The PF module 630 is a kernel process configured to implement firewall functionality with a concomitant PF rule set 635 (e.g., iptables), whereas the encryption/decryption module 640 is responsible for encrypting and decrypting network traffic based on the network policy. Illustratively, one or more of these modules may be configured to provide unique, special-purpose conditional tests and actions that are deployed using "hooks" in the metavisor network protocol stack 650 and which are called at particular points of processing in the metavisor 600.

In one or more embodiments, the identity documents 310, cryptographically-signed JWT tokens 400 and embedded tags 425 may be used to create the various IT policies at a computer node such as, e.g., the user endpoint 170. The various IT policies, such as network policy, may then be stored in a repository (e.g., database 550) of the control plane 500. The control plane 500 evaluates (i.e., compares) the tags 425 of the authenticated JWTs 400 and the authenticated identity documents 310 with its stored network policy to permit release of keys 340 to the metavisors for secure cryptographic operations (e.g., cryptographically secure access to network services). Illustratively, the released keys may be transmitted within a secure (encrypted) TLS 1.2 connection response, although such keys may alternatively be transmitted via an encrypted JWT. Access to the virtualized resources may then be enforced at the metavisors 600 in accordance with the network policy associated with the JWT tags 425.

In an embodiment, the network policy may be employed at the metavisors 600 to control end-to-end communication between compute resources (e.g., the metavisors) using the network configuration to establish connections and/or encryption of network flows. Illustratively, a policy engine of the control plane may be embodied as database web application configured to store the network policy as defined by an administrator interacting with the web application, wherein the stored policy is based, at least in part, on the identity document 310 and tags 425 contained in associated JWT 400. As used herein, network policy may denote a pattern of network (packet) traffic with an associated action against which a network flow of a packet is compared. Network flows represent network activity performed by the guest OS 210, i.e., any packet sent or received by the metavisor 600 on behalf of the guest OS is part of a network flow. The network flow may be defined as a 5-tuple that includes information obtained from IP and transport layer (TCP and UDP) headers of a packet, such as (i) source and (ii) destination IP addresses, as well as (iii) source and (iv) destination port numbers, and (v) protocol type. The network policy may also be defined as a 5-tuple that includes a source, a destination, protocol type, one or more (i.e., a range of) destination port numbers, and an action, wherein the source and destination may be identified implicitly using tags. As noted, a tag 425 is an arbitrary key-value pair embedded within the payload 420 of a token data structure (illustratively a JWT 400) as one or more private claims that enable attachment of the network policy to one or more instances, e.g., metavisors of VMIs 200. As used herein, a private claim, e.g., as in a JWT, is in a namespace not sought to be resolved by public name resolution or registration.

According to the technique, attachment (assignment) of a network policy to the metavisors may be effected by associating the network policy to a global firewall and apportioning (i.e., dividing) the global firewall into individual firewalls applied at the metavisors 600 running in the network. In one or more embodiments, the global and individual firewalls are characterized by flow state used to identify network flows. However, the individual firewalls (implemented as firewall functionality of the PF module 630) may also be configured to provide packet filtering services for security purposes, such as blocking ingress or egress packets, packet spoof detection, and IP address blacklisting. Illustratively, implementation of the global firewall is distributed to the metavisors acting as individual firewalls, each enforcing the network policy via their respective portion of the global firewall.

Figure 7:
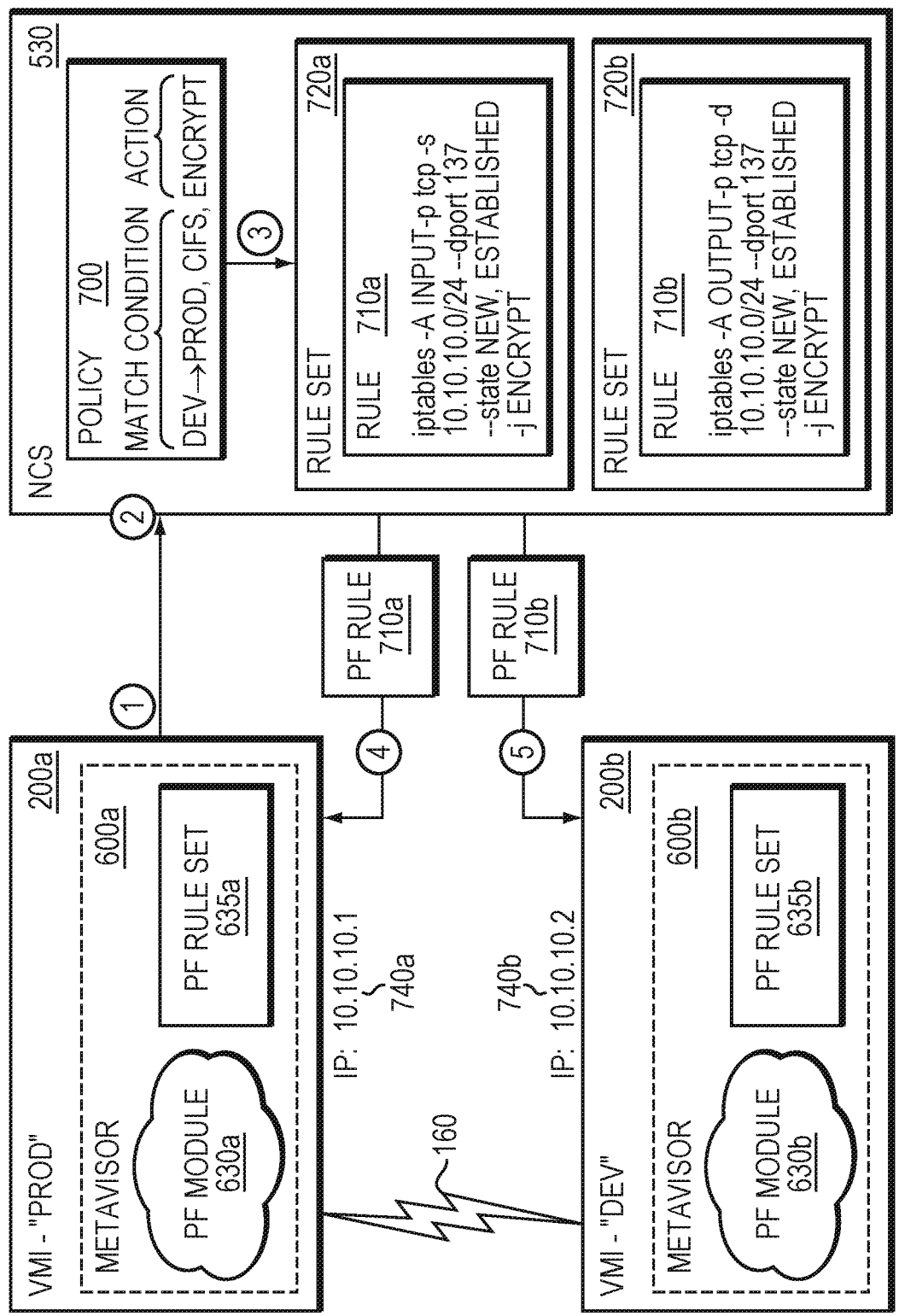
FIG. 7 is a block diagram of a global firewall apportioned into one or more individual firewalls applied at one or more metavisors.

FIG. 7 is a block diagram of a global firewall apportioned into one or more individual firewalls applied at one or more metavisors. Apportionment (i.e., division) of the global firewall into individual firewalls essentially creates a network policy per metavisor, e.g., via a "custom" network configuration 330, embodied as the rule set 635 for the PF module 630 of each metavisor. To that end, the control plane 500 translates the network policy/global firewall 700 into rules of an individual firewall, illustratively embodied as a PF rule set 635$a,b$ associated with the PF module 630$a,b$ of each metavisor 600$a,b$, wherein each rule in the rule set may include a policy condition and an action. The network policy on a firewall may be embodied as a set of matched policy conditions ("matched conditions") that may be determined by examination of one or more firewall rules of the PF rule set, such as, if content of a packet/header matches the policy condition of a rule (e.g., a new or established connection on a given port from a source subnet), then an action (e.g., accept the network traffic) on the packet may be performed. That is, the policy condition describes the rule to match/compare with the content of a packet and an action describes an operation to perform on the packet (e.g., allow and/or encrypt) if the content results in a matched condition.

Illustratively, the policy condition for a policy 700 may be provided as one or more physical constructs, such as any of the elements of the 5-tuple network flow expressed as, e.g., IP addresses of CIDRs, protocol type included in an IP header, or port numbers (destination ports) included in a transport layer (L4) header of a packet. In addition, the policy condition may be provided as one or more logical constructs, such as the tags 425 contained in the payload 420 of the JWT token 400. For example, the policy 700 "dev to prod, CIFS, encrypt" may indicate that a "development" environment (subnet) acts as a source connecting (e.g., via a transport layer connection) to a destination "production" subnet using the CIFS protocol (e.g., IANA registered port 137). However, enforcement of the rules of the PF rule set 635 $a,b$ at the individual metavisors 600$a,b$ generally relies on physical (not logical) constructs. That is, logical constructs (e.g., tags) included in the network policy may include abstractions (e.g., "development" and "production") that are not resolved at the individual firewalls (e.g., metavisors). The control plane 500 thus further translates the logical constructs (e.g., tags) into physical constructs (e.g., IP addresses) that are present in the network traffic (e.g., packets) and that form the basis of the rules of the PF rule set distributed to each metavisor. As such, the control plane translates the tags 425 "development (dev)" and "production (prod)" into respective source and destination IP addresses of a network flow that may then be mapped (matched) to the corresponding network policy 700, e.g., the source IP address of the flow matches to the left-side (origin) "dev" of the policy "dev to prod, CIFS, encrypt". Accordingly, the policy 700 is distilled into individual rule sets 635$a,b$ for the metavisors 600$a,b$ without the metavisors being aware of the namespace used by the policy 700. Advantageously, the tag-based-policy architecture operates (i.e., enforces network policy) without (1) modification of the guest OS, such as insert of an agent, and without (2) enforcement in a network infrastructure (e.g., a network switch) as opposed to endpoints (i.e., the VMIs).

Assume first and second metavisors 600$a,b$ have IP addresses "10.10.10.1" (740$a$) and "10.10.10.2" (740$b$), respectively, and have tags 425 within their respective JWT tokens 400 that specify "dev:prod." In an embodiment, the IP addresses are public addresses assigned by a CSP. Each metavisor 600 may report its tag ("dev", "prod") and IP address (10.10.10.1; 10.10.10.2, respectively) to the control plane 500. Assume further that the control plane 500 has a network policy 700 that specifies "dev to prod, CIFS (e.g., IANA port number 137), encrypt (e.g., action)." According to the technique, the control plane translates the logical tag constructs to physical address constructs, and then pushes the translated constructs to the metavisors via custom network configurations 330. For example, the control plane pushes a first network configuration (e.g., Rule 710$a$) including 10.10.10.1-10.10.10.2; protocol type PT, port number PN, allow (illustratively embodied as an iptables rule "iptables -A INPUT -p tcp -s 10.10.10.0/24 --dport 137 --state NEW, ESTABLISHED -j ENCRYPT") to the first metavisor 600$a$ and pushes a second network configuration (e.g., Rule 720$b$) including 10.10.10.2-10.10.10.1, protocol type PT, port number PN, allow to the second metavisor 600$b$ (illustratively embodied as an iptables rule "iptables -A OUTPUT -p tcp -d 10.10.10.0/24 --dport 137 --state NEW, ESTABLISHED -j ENCRYPT"). Note that, in some embodiments, multiple rules may be generated from a single policy (e.g., often denoting bidirectional communication), and that not all elements of the 5-tuple network flow may be present in any rule.

Furthermore, in some embodiments, the metavisors may poll (i.e., pull) the network configuration (e.g., PF rules 710*a,b*) from the control plane. As such, a poll request from the metavisor 600*a* (denoted as circled "1") may be received by the NCS 530 (denoted as circled "2") of the control plane, which may respond to the request by compiling (i.e., translating) the policy 700 into rule set 720*a* (denoted as circled "3") specific to the metavisor 600*a*. A specific rule 710*a* is then returned (denoted as circled "4") in response to the poll request from metavisor 600*a*. In other embodiments, a rule 710*b* may simply be "pushed" (denoted as circled "5") to the metavisor 600*b* after the NCS has compiled (i.e., generated) a specific rule set 720*b*. In accordance with the distributed enforcement point aspect of the tag-based policy architecture, each metavisor 600 may then invoke the PF module 630 to analyze a network flow, compare the flow (e.g., 5-tuple) with the rule set of the PF filter table, and render a decision based on whether there is a match.

As noted, network policy enforced on a firewall may be implemented as a firewall rule having an action, e.g., encrypt. The firewall rules may be organized as an IP address-based data structure (e.g., a PF address table) having a rule set that may be accessed independently by the PF module 630 of the metavisor 600, e.g., via a lookup operation for the policy condition of the rule, and may be accessed by the encryption/decryption module 640 of the metavisor, e.g., via a separate lookup operation for the action of the rule. According to the technique, a hybrid PF and encryption/decryption (i.e., hybrid PF/IPSec) implementation for enforcing network policy provides only a single lookup operation for these modules. Illustratively, a packet arriving at the metavisor 600 is processed first by the PF module 630, which performs the lookup operation into the PF address table to determine (i) a matched condition of rules of the rule set 635 based on examination of the network flow of the packet and (ii) whether an encryption action should be performed on the packet. If so, the PF module 630 applies (i.e., associates) an internal action tag (e.g., a software construct instructing "encrypt") to the packet, and the metavisor invokes the encryption/decryption module 640 to encrypt the packet. As a result, packets are decrypted prior to firewall rule application (i.e., network policy enforcement) so that the firewall can operate on the non-encrypted network flow information, such as the transport layer (TCP or UDP) header information (which is normally hidden/encrypted using IPsec) and, particularly, the port numbers, to correctly identify the network flow.

Application of a tag to the packet involves additional state (e.g., new or established connection) associated with the firewall/PF rules that is used to identify the network flow of the packet as associated with the metavisor 600, the guest OS 210, or an external destination (i.e., destination in the computer network), and the determination that the flow should be (transparently) encrypted. The metavisor then invokes the encryption/decryption module 640 to encrypt the packet. Notably, the module 640 encrypts the upper layer payload (e.g., transport layer and above) of the packet (e.g., IP datagram) in accordance with a transport mode of the IPSec protocol. An example of packet traffic processing at the metavisor to perform such tagging and/or encryption of the packets is described in commonly owned U.S. patent application Ser. No. 15/420,523, titled Transparent Deployment of Metavisor Into Guest Operating System Network Traffic, by Marcel Moolenaar, filed Jan. 31, 2017, the contents of which application are hereby incorporated by reference.

An aspect of network policy relates to providing visibility (i.e., monitoring) of network traffic on the computer network 150 and, more specifically, to customer monitoring of network flows over the network. In a prior approach, an agent may be provided that samples the network packet traffic to extract network flow information and provide that information to a customer, out-of-band, i.e., separate from network data path processing. Such sampling typically involves copying/duplication of packets, which does not scale well and hinders performance. For example, assume the packet traffic propagates over the network at a rate of 1 Gb/sec. If 10% of the traffic is sampled, 100 Mb/sec of packet traffic is extracted by creating copies of the sampled packets, which is substantial. Instead of creating copies of the entire sampling of the packets, the technique described herein replicates only the network flows of the packets processed by the PF module 630 of the metavisor 600. The control plane 500 may then provide flow visibility to the customer using a standard protocol (e.g., the NetFlow protocol, Internet Engineering Task Force RFC 3954 and RFC 7270) to publish the network flows of packets processed by the PF module 630. Note that as is known by persons of skill in the art, information of network flows may be in any format arranged by the control plane and understood (decoded) by a receiver of the published information.

Figure 8:
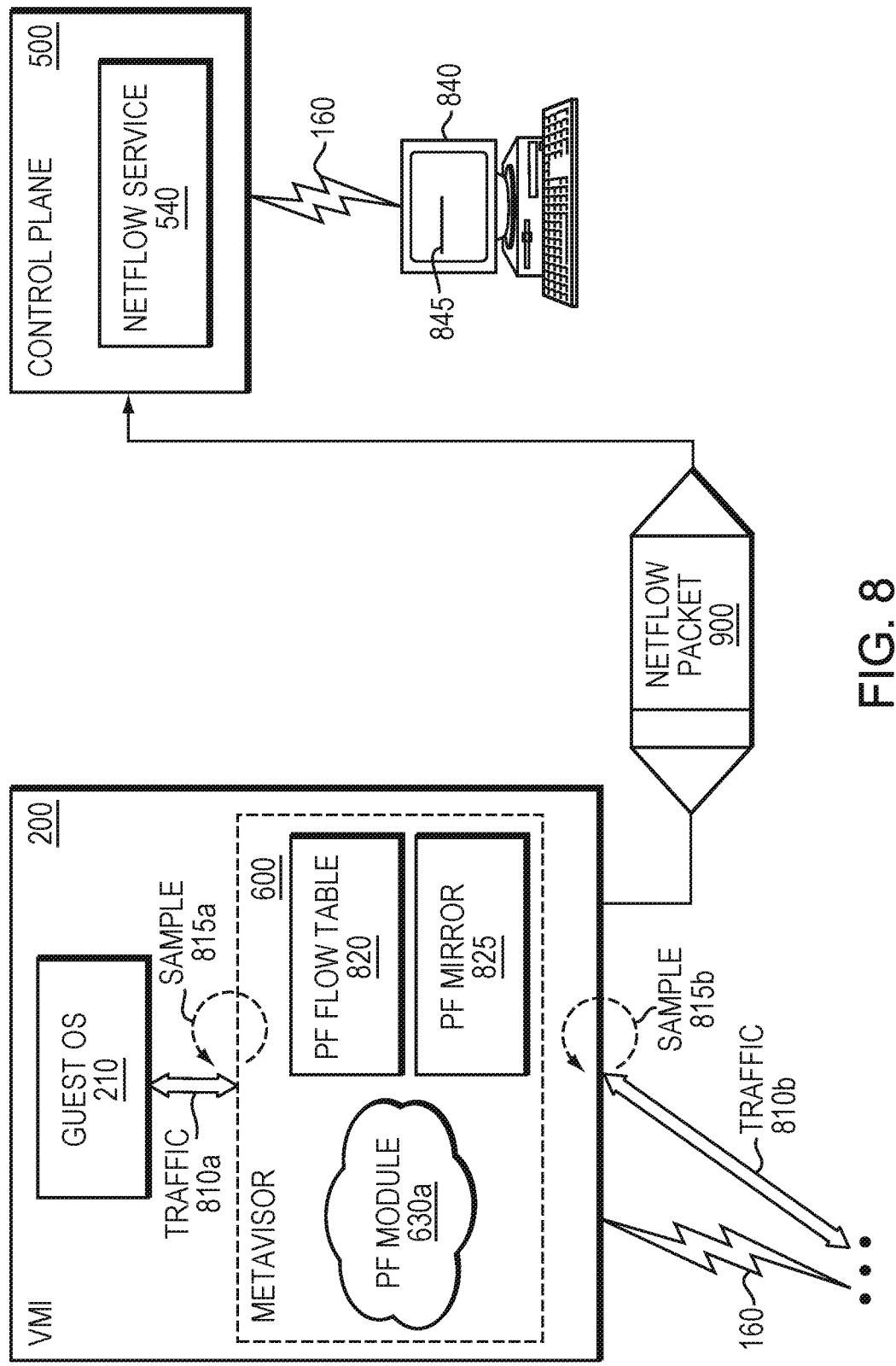
FIG. 8 is a block diagram of network flow visibility using the tag-based policy architecture.

FIG. 8 is a block diagram of network flow visibility using the tag-based policy architecture. According to the technique, the PF module 630 maintains information of the processed network flows in a flow-based data structure (e.g., a PF flow table 820) as 5-tuple flow state that is replicated to a mirror data structure (e.g., PF mirror table 825) using, e.g., a PF sync operation of the metavisor. The metavisor 600 then translates the 5-tuple flow state of the PF mirror table 825 to packet data of a NetFlow packet 900 that is delivered to NETFL 540 of the control plane 500 for publication (e.g., display) to the customer (e.g., an administrator) via graphical user interface 840 (GUI) available over the network 160. Illustratively, a small sample 815 of traffic 810 (e.g., 1%) is copied to the PF mirror 825 and published via the Netflow protocol. The traffic 810 may be sampled at different rates (i.e., sample 815*a* vs. 815*b*) depending on its origin.

Figure 9:
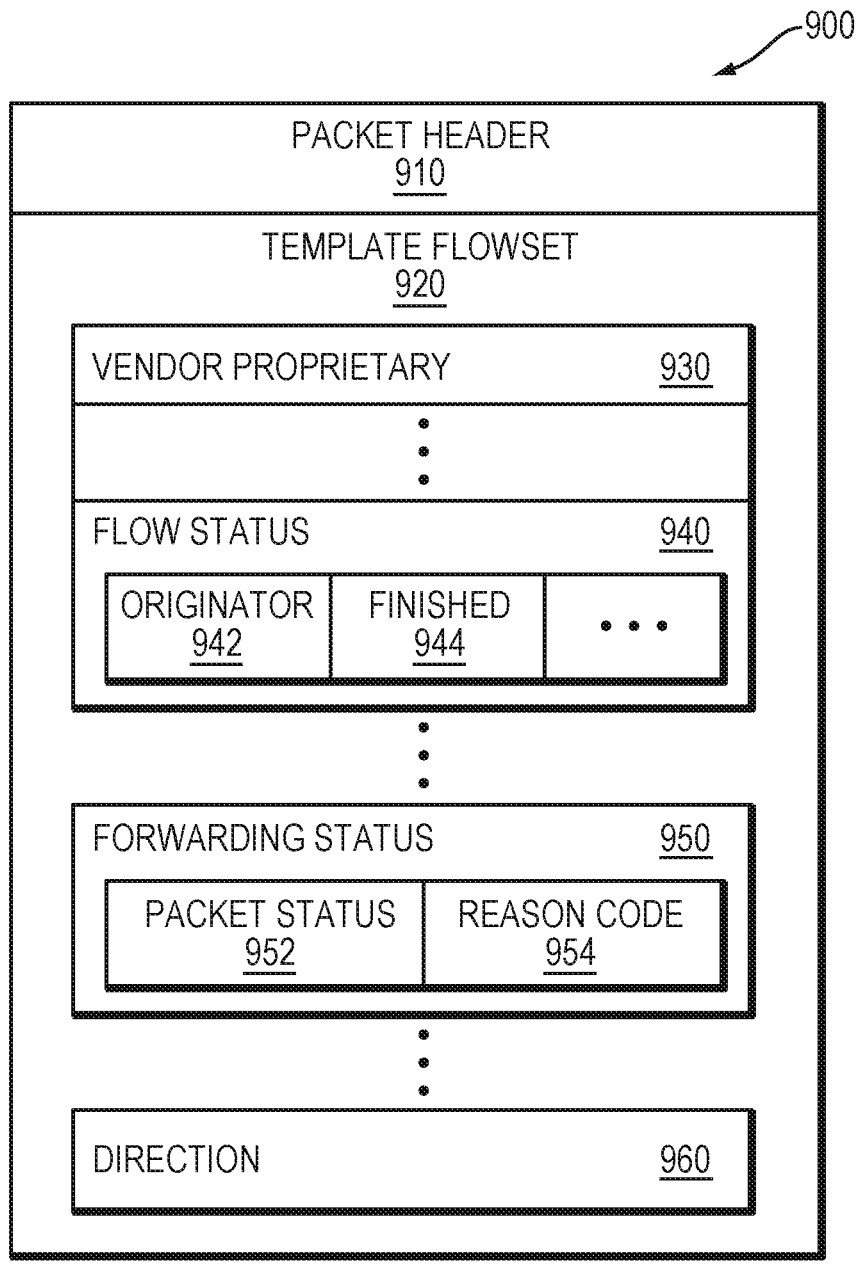
FIG. 9 is a block diagram of an example NetFlow packet.

A further aspect of visibility provides association of network policy with network flows as graphical elements 845 via the GUI to, e.g., enable the customer to identify the network policy that allows a particular network flow (such as an undesired or problematic flow) to propagate through the network. Such association may be provided by the addition of an extension to the NetFlow packet. FIG. 9 is a block diagram of an example NetFlow packet that may be advantageously used with the embodiments disclosed herein. The NetFlow packet 900 has a data export format defined by RFCs 3954 and 7270, and includes a packet header 910 followed by one or more Template FlowSets 920 having one or more field types 930 denoted as "vendor proprietary." According to the technique, one of these field types is an 8-bit field 940 used to provide status of the network flow propagating through the network. Specifically, the flow status field 940 may be added as a field type (e.g., field type 87) of the Template FlowSet 920 that allows the control plane to determine the network policy associated with the network flow, i.e., content of the flow status field 940 identifies the guest OS 210 of the VMI 200 associated with the metavisor 600 that originated a transport layer connection for the network flow (i.e., the originator instance) or the guest OS 210 of the VMI 200 associated with the metavisor 600 that responds to the connection (i.e., the destination instance). As such, the control plane may associate bidirectional network flows (i.e., a network flow in each direction) corresponding to a coordinated communication between endpoints (e.g., a session of a higher-level protocol between the endpoints). Once the appropriate instance is identified, the control plane 500 may associate (map) the source or destination IP address of the network flow to a network policy, as described further herein. As result, the Netflow packet information with extension is sufficient to match against a network policy directed toward a higher-level protocol (e.g., "dev to prod, CIFS"), because network flows associated with the protocol in either direction may be identified. The technique thus extends the 5-tuple flow state to a 6-tuple flow state that identifies, e.g., the IP address of the initiating VMI/metavisor where the flow originated. As noted above, information of network flows may be in any format arranged by the control plane and understood (decoded) by a receiver of the published information.

In an embodiment, the content of the flow status field 940 (6th tuple) may be a first Boolean variable (e.g., a 1-bit originator flag 942) having true/false state indicating whether the guest OS associated with the metavisor (source IP address of the network flow) originates the connection for the network flow. That is, the originator flag 942 indicates whether traffic 810*a* originated from the guest OS as an originator instance (e.g., assertion of the flag 942) or whether the traffic 810*b* flows from the responding destination instance over the network (e.g., non-assertion of the flag 942). The content of the flow status field 940 may also include a second Boolean variable (e.g., a 1-bit finished flag 944) having true/false state indicating whether the flow has terminated (e.g., assertion of the flag 944) or has not terminated (e.g., non-assertion of the flag 944). Notably, the originator flag 942 is distinct from the notion of flow direction (e.g., RFC 3954 field type 61) which alone is insufficient to associate coordinated communication between endpoints (e.g., a session of a higher-level protocol between the endpoints).

In one or more embodiments, the network policy may be created (written) with regards to communication of packets between an originator instance and a destination instance. Through use of the originator flag 942, the control plane may identify the network flow that corresponds to an "originator to destination" packet communication and then map the source IP address of the flow to the appropriate policy (i.e., the left-side of the policy as previously described herein.) Conversely, if the network flow corresponds to a "destination to originator" packet communication, the control plane maps the destination IP address of the flow to the policy. In essence, a determination may be rendered as to whether the flow originates at an instance that initiates a transport layer connection for packet communication or at an instance the responds to the communication to thereby enable matching of the appropriate source or destination IP address of the flow to the policy.

Network flow visibility may be further expanded by publishing blocked flows to the administrator using, e.g., a forwarding status field 950 of the Template FlowSet 920 as defined by RFCs 7270 and 3954. The forwarding status field 950 is illustratively an 8-bit field wherein the upper two bits are organized as a status field 952 that is encoded to a value that indicates a status of the packet. For example, the value "2" of the packet status field 952 indicates that the packet was dropped (blocked). The remaining 6 bits of the field 950 are organized as a reason code field 954 that is encoded to provide a reason for the indicated status. Typically, the encoded packet status field 952 of the forwarding status field 950 provides status information of a packet from the perspective of a single firewall.

According to the technique, the originator bit 942 may cooperate with the forwarding status field 950 to convey the status of a network flow from a distributed firewall having geographically disbursed points in a network. When a metavisor rejects a packet based on one or more firewall rules, the Template FlowSet 920 of a NetFlow packet 900 may be created with the packet status field 952 of the forwarding status field 950 encoded to dropped or blocked. Specifically, the originator bit 942 and the packet status field 952 cooperate to allow the administrator to identify the network policy that was invoked by a packet of the problematic flow (i.e., blocked) from an originator instance of a distributed firewall in the network. Furthermore, the originator bit 942 and forwarding status field 950 allow the administrator to visualize the network flow/traffic on a connection that was initiated by a guest OS 210 (on egress) or that arrived on the network adapter 128 (on ingress) that was in violation of the policy. Other field types of the Template Flowset, such as the direction field 960 (field type 61), could not be used with the forwarding status field 950 to convey the status of a network flow from a distributed firewall because such a use would violate the intended meaning of the field.

While there have been shown and described illustrative embodiments of a technique for implementing network policy deployed in a tag-based policy architecture of a virtualized computing environment, it is to be understood that various other adaptations and modifications may be made within the spirit and scope of the embodiments herein. For example, embodiments have been shown and described herein with relation to translation of logical constructs (i.e., tags 425) to physical constructs (i.e., IP addresses) that are present in the network traffic (e.g., packets). The translated IP addresses (e.g., embodied as firewall rules) are then pushed from the control plane to the metavisors as network configuration (i.e., network policy) used to develop PF rule sets of a firewall applied by the metavisors in order to determine actions to be performed on the packets. The network policy enforced on the firewall may be embodied as a set of matched conditions that may be determined by examination of one or more firewall rules of the PF rule set. However, the embodiments in their broader sense are not so limited, and may, in fact, allow for logical constructs other than tags to be included in the network policy as matched conditions. For example, metadata of a CSP, including identifiers such as regional information and/or identity documents, may be translated to physical constructs such as IP addresses that are compared (as matched conditions) to network flows to determine actions to be performed on packets, such as whether communication between VMIs may be allowed.

Advantageously, network policy in accordance with the technique described herein is implemented by a control plane and a metavisor deployed and controlled by an administrator of a customer and, as such, provides a strong enforcement of the network policy, i.e., an assurance that the network policy enforcement cannot be turned off or otherwise disabled by a user (or malicious software) of the guest OS. Further, the network policy in the tag-based policy architecture facilitates securing/protection of publically-accessible nodes (i.e., having public IP addresses) provided by one or more CSPs in public cloud as if those nodes were behind a firewall. Moreover, the addition of the extension (i.e., originator bit/flag) to the NetFlow packet allows transformation of the raw network flow information contained in the packet into a high-level construct that enables mapping of a network flow to a network policy for, inter alia, network flow visibility to the administrator.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
   one or more processors coupled to a network of a virtualized computing environment;
   a control plane executable by at least one of the one or more processors, the control plane configured to implement a network policy of the virtualized computing environment by associating the network policy to a global firewall and apportioning the global firewall into one or more individual firewalls, the control plane further configured to translate the network policy associated with the global firewall into rules of an individual firewall; and
   a packet filter module executable by at least one processor of a first computer node, the packet filter module configured to receive the rules from the control plane and implement the individual firewall to enforce the network policy on packets of network traffic as a respective portion of the global firewall, wherein the first computer node is configured to execute a hypervisor and a virtual machine instance (VMI), wherein the VMI is managed by the hypervisor, wherein a guest operating system and an intermediary manager run in the VMI, wherein the packet filter module is a component of the intermediary manager, wherein the packet filter module is configured to enforce the network policy on the packets when passed between the hypervisor and the guest operating system.

2. The system of claim 1 wherein the network policy is defined as a tuple that includes a source and a destination, and wherein the source and the destination are identified using one or more tags.

3. The system of claim 2 wherein the tag is a key-value pair embedded within a payload of a token data structure that enables attachment of the network policy to the intermediary manager.

4. The system of claim 1 wherein the intermediary manager is a metavisor, and operates as a transparent intermediary between the guest operating system and the hypervisor.

5. The system of claim 1 wherein the network policy includes a logical construct translated into a physical construct present in the network traffic.

6. The system of claim 5 wherein the logical construct is a tag embedded within a payload of a token data structure that enables attachment of the network policy to the intermediary manager.

7. The system of claim 5 wherein the physical construct is a network address that forms a basis of the rules of the individual firewall.

8. The system of claim 1 wherein each rule includes a policy condition and an action, and wherein the network policy comprises a set of matched policy conditions that trigger corresponding actions by examination of the rules of the individual firewall.

9. The system of claim 8 wherein the policy condition describes the rule to compare with content of the packets and the action describes an operation to perform on the packets if the content results in a matched policy condition.

10. The system of claim 9 wherein the operation to perform on the packets is one of allow and encrypt.

11. The system of claim 8 further comprising an encryption/decryption module executable by the first computer node, the encryption/decryption module configured to one of encrypt and decrypt the packets of the network traffic based on the network policy.

12. The system of claim 11 wherein the rules of the individual firewall are organized as an address-based data structure accessed via a single lookup operation by the packet filter module for the policy condition of each rule and for the action of the rule performed by the encryption/decryption module.

13. The system of claim 12 wherein the packet filter module performs the lookup operation into the address-based data structure to determine a matched policy condition and whether an encryption action should be performed on a packet of the network traffic.

14. The system of claim 13 wherein, in response to the matched policy condition, the packet filter module applies an internal action flag to the packet and the encryption/decryption module is invoked to process the packet according to the encryption action.

15. The system of claim 14 wherein the internal action flag is a software construct instructing the action encrypt.

16. The system of claim 14 wherein the packet is decrypted prior to application of the rules so that the individual firewall operates on non-encrypted network flow information.

17. A method comprising:
   implementing a network policy of a virtualized computing environment by associating the network policy to a global firewall at a control plane coupled to a network of the virtualized computing environment;
   apportioning the global firewall into one or more individual firewalls;
   translating the network policy associated with the global firewall into rules of an individual firewall;
   receiving the rules from the control plane at a module executed on a first computer node coupled to the network; and
   implementing the individual firewall at the module to enforce the network policy on packets of network traffic as a respective portion of the global firewall, wherein the first computer node is configured to execute a hypervisor and a virtual machine instance (VMI), wherein the VMI is managed by the hypervisor, wherein a guest operating system and an intermediary manager run in the VMI, wherein the module is a component of the intermediary manager, wherein the module is configured to enforce the network policy on the packets when passed between the hypervisor and the guest operating system.

18. The method of claim 17 further comprising:
defining the network policy as a tuple that includes a source and a destination; and
identifying the source and the destination using one or more tags.

19. The method of claim 18 wherein the tag is a key-value pair embedded within a payload of a token data structure that enables attachment of the network policy to the intermediary manager.

20. A non-transitory computer readable media containing instructions for execution on a processor for a method comprising:
implementing a network policy of a virtualized computing environment by associating the network policy to a global firewall at a control plane coupled to a network of the virtualized computing environment;
apportioning the global firewall into one or more individual firewalls;
translating the network policy associated with the global firewall into rules of an individual firewall;
receiving the rules from the control plane at a module executed on a first computer node coupled to the network; and
implementing the individual firewall at the module to enforce the network policy on packets of network traffic as a respective portion of the global firewall, wherein the first computer node is configured to execute a hypervisor and a virtual machine instance (VMI), wherein the VMI is managed by the hypervisor, wherein a guest operating system and an intermediary manager run in the VMI, wherein the module is a component of the intermediary manager, wherein the module is configured to enforce the network policy on the packets when passed between the hypervisor and the guest operating system.

* * * * *